(12) United States Patent
Heppard

(10) Patent No.: US 10,850,554 B2
(45) Date of Patent: Dec. 1, 2020

(54) ARTIST PERSPECTIVE TOOL

(71) Applicant: Martha Christine Heppard, Greenwood Village, CO (US)

(72) Inventor: Martha Christine Heppard, Greenwood Village, CO (US)

( * ) Notice: Subject to any disclaimer, the term of this patent is extended or adjusted under 35 U.S.C. 154(b) by 232 days.

(21) Appl. No.: 16/215,108

(22) Filed: Dec. 10, 2018

(65) Prior Publication Data

US 2020/0180350 A1 Jun. 11, 2020

(51) Int. Cl.
| | | |
|---|---|---|
| *B43L 13/14* | (2006.01) | |
| *G01B 3/04* | (2006.01) | |
| *B43L 7/10* | (2006.01) | |
| *B43L 13/18* | (2006.01) | |

(52) U.S. Cl.
CPC ............ *B43L 13/145* (2013.01); *B43L 7/10* (2013.01); *B43L 13/18* (2013.01); *G01B 3/04* (2013.01)

(58) Field of Classification Search
CPC ........... B43L 13/145; B43L 13/18; B43L 7/10
USPC .................................................. 33/18.3, 278
See application file for complete search history.

(56) References Cited

U.S. PATENT DOCUMENTS

| | | | |
|---|---|---|---|
| 496,558 A | 5/1893 | Findlay | |
| 915,426 A | 3/1909 | Goehring | |
| 1,415,833 A * | 5/1922 | Ginsburg | B43L 13/16 434/90 |
| 1,581,225 A * | 4/1926 | Parkhill | B27G 17/00 33/465 |
| 1,645,752 A * | 10/1927 | Hansen | B43L 13/18 33/277 |
| 3,086,296 A * | 4/1963 | Bergstrom | B43L 13/16 434/90 |
| 3,262,452 A | 7/1966 | Hardy et al. | |
| 3,908,281 A * | 9/1975 | Fox | G01C 5/00 33/228 |

(Continued)

FOREIGN PATENT DOCUMENTS

| | | | | |
|---|---|---|---|---|
| CN | 202463351 U | 10/2012 | | |
| GB | 2190885 A | * 12/1987 | ............. | B43L 13/16 |

OTHER PUBLICATIONS

Jerry's Artarama "Creative Mark Proportional Divider", https://www.jerrysartarama.com/drawing-illustration/perspective-tools/proportional-divider/proportional-divider, downloaded Oct. 19, 2018, pp. 1-3, JerrysArtarama.com.

(Continued)

*Primary Examiner* — Christopher W Fulton
(74) *Attorney, Agent, or Firm* — Fogg & Powers LLC

(57) ABSTRACT

In one embodiment, an artist tool for capturing relationships between features comprises: a first transparent blade; and a second transparent blade, the first and the second transparent blade each having a length extending from a first to a second distal end, and a width extending from a first to a second edge, each having a fastener hole offset from a center point; a fastener that penetrates through the fastener holes of the first and second blades such that the first blade is rotatably coupled to the second blade by the fastener. At least one of the first or second blades comprise a first linear slit that extends along a center axis between the first distal end and the fastener hole. Either blade may include a second linear slit that extends between the second distal end and the fastener hole. The center axis passing through a center of the fastening hole.

20 Claims, 6 Drawing Sheets

(56) References Cited

U.S. PATENT DOCUMENTS

| | | | | |
|---|---|---|---|---|
| 5,632,094 | A | * | 5/1997 | Mills ..................... B43L 13/145 33/1 K |
| 5,718,053 | A | * | 2/1998 | Strow ..................... B43L 13/18 33/1 K |
| 5,896,671 | A | * | 4/1999 | Yu ......................... B43L 13/205 33/1 SB |
| 7,082,692 | B2 | * | 8/2006 | Shapiro ..................... B43L 7/10 33/464 |
| 2001/0052189 | A1 | * | 12/2001 | Kreisler ................... B43L 7/10 33/473 |
| 2004/0040164 | A1 | * | 3/2004 | Williams ................ B25H 7/00 33/473 |
| 2014/0373372 | A1 | * | 12/2014 | Flippo ..................... B43L 7/10 33/418 |

OTHER PUBLICATIONS

Derwent, "Scale Divider, Compas de reduction", photo taken Oct. 23, 2018.

Wescott, "Wescott Goniometer Protractor", https://www.michaels.com/westcott-goniometer-protractor/10408963.html, downloaded Oct. 16, 2018, p. 1, Michaels Stores.

Unknown, "http://faculty.missouri.edu/leongl/Courses/InstructionalMaterial/PeceptualDrawCurtisW.pdf" created Jan. 19, 2003, downloaded Oct. 19, 2018, 19 pages.

Fussel, "7 Drawing Techniques for Accuracy", The Virtual Instructor, Oct. 2, 2016, pp. 1-12, www.thevirtualinstructor.com.

Garcia, "Perspectographs", DrawingMachines.org, downloaded Oct. 23, 2018, pp. 1-2.

Garcia, "Plotters", DrawingMachines.org, downloaded Oct. 23, 2018, pp. 1-2.

Garcia, "Sighting Pantograph, Giulio Troili 1683", DrawingMachines.org, downloaded Oct. 23, 2018, p. 1.

Alibaba.com, "Angle Measurement Tool, kungfuren 2 Pack Premium Aluminum Alloy Template Tool for Measuring Angles 4 Sided Angulizer Ruler with 2pcs Drawing Pencil and 2 Storage Bags for Builder, Carpenters, DIYers", Alibaba.com, downloaded Oct. 16, 2018, p. 1.

Kemp, "How to Draw Perspective for Beginners", Will Kemp Art School, downloaded Oct. 19, 2018, pp. 1-21, www.willkempartschool.com.

Lundgren, "Drawing Basics: How to Find Angles and Proportions in Linear Perspective", Avalyn creative, downloaded Oct. 19, 2018, pp. 1-7, www.avalyn.com.

Saad, "Plastic Goniometer", Shutterstock.com, downloaded Oct. 16, 2018, p. 1, Shutterstock, Inc.

Timbs, "The Year-Book of Facts in Science and Art: Exhibiting the Most Important Discoveries & Improvements of the Past Year; In Mechanics and the Useful Arts; Natural Philosophy; Electricity; Chemistry; Zoology and Botany; Geology and Geography; Meteorology and Astronomy", London: Savill and Edwards, Printers, Chandos Street, 1854, p. 139, Harvard College Library.

Watt, Perspective machine by James Watt, engraved "James", Watt's Perspective Apparatus, www.sciencemuseum.uk.org, downloaded Oct. 24, 2018, p. 1, Science Museum Group Collection; The Board of Trustees of the Science Museum.

* cited by examiner

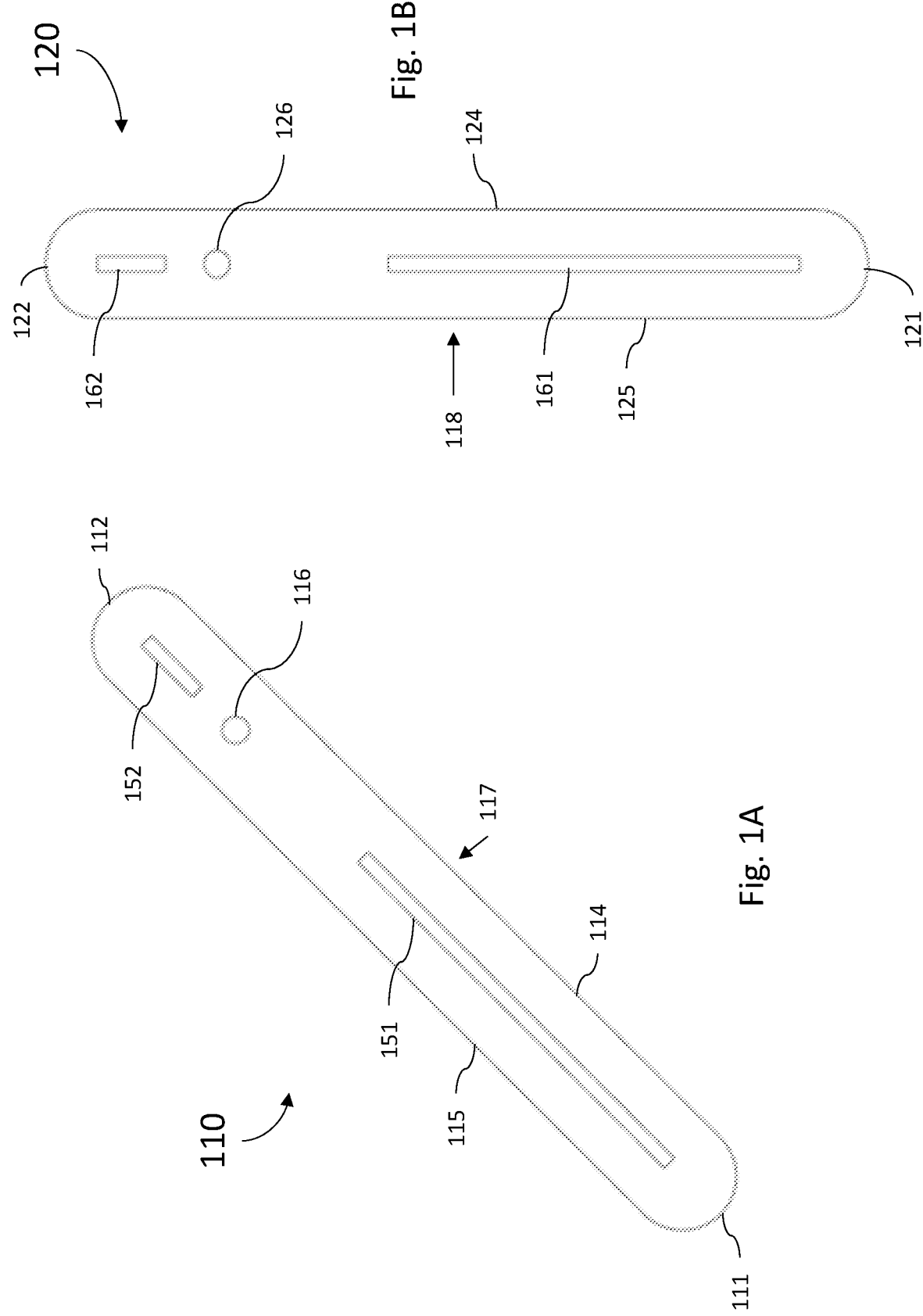

ARTIST PERSPECTIVE TOOL

BACKGROUND

Artists are often faced with the task of capturing a relationship between objects or features that exist in a three-dimensional space onto a two-dimensional or three-dimensional working space or surface, in order to create for example, a drawing, painting, etching or sculpture. A method traditionally used by artists is to hold a prop, such as a pencil, paintbrush, carving tool, or the like, within their line of sight between their eye and their subject and attempt to project features of their subject onto locations of that prop, and then move their arm to relocate the prop to their working space to try to visually judge how to re-project the position of the features onto the working space. This method is fraught with numerous ways to introduce errors, and even experienced artists may require multiple iterations before obtaining a result that adequately captures the relationship on the working space.

For the reasons stated above and for other reasons stated below which will become apparent to those skilled in the art upon reading and understanding the specification, there is a need for an artist perspective tool.

SUMMARY

The Embodiments of the present disclosure provide methods and systems for an artist perspective tool and will be understood by reading and studying the following specification.

In one embodiment, an artist tool for capturing relationships between features comprises: a first transparent blade; and a second transparent blade, the first transparent blade and the second transparent blade each having a length extending from a first distal end to a second distal end, and a width extending from a first edge to a second edge, each having a fastener hole offset from a center point, with respect to the length of each blade; a fastener that penetrates through the fastener hole of the first blade and the fastener hole of the second blade such that the first transparent blade is rotatably coupled to the second transparent blade by the fastener; the first transparent blade and the second transparent blade each comprising a first linear slit that extends along a center axis between the first distal end and the fastener hole, and a second linear slit that extends along the center axis between the second distal end and the fastener hole, wherein the center axis passes through a center of the fastening hole.

DRAWINGS

Embodiments of the present disclosure can be more easily understood and further advantages and uses thereof more readily apparent, when considered in view of the description of the preferred embodiments and the following figures in which:

FIGS. 1, 1A, 1B and 1C are diagrams illustrating an artist tool 100 for capturing relationships between features in a scene within a field of view.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized, and that logical, mechanical and electrical changes may be made without departing from the scope of the present disclosure. The following detailed description is, therefore, not to be taken in a limiting sense.

Figure 1:
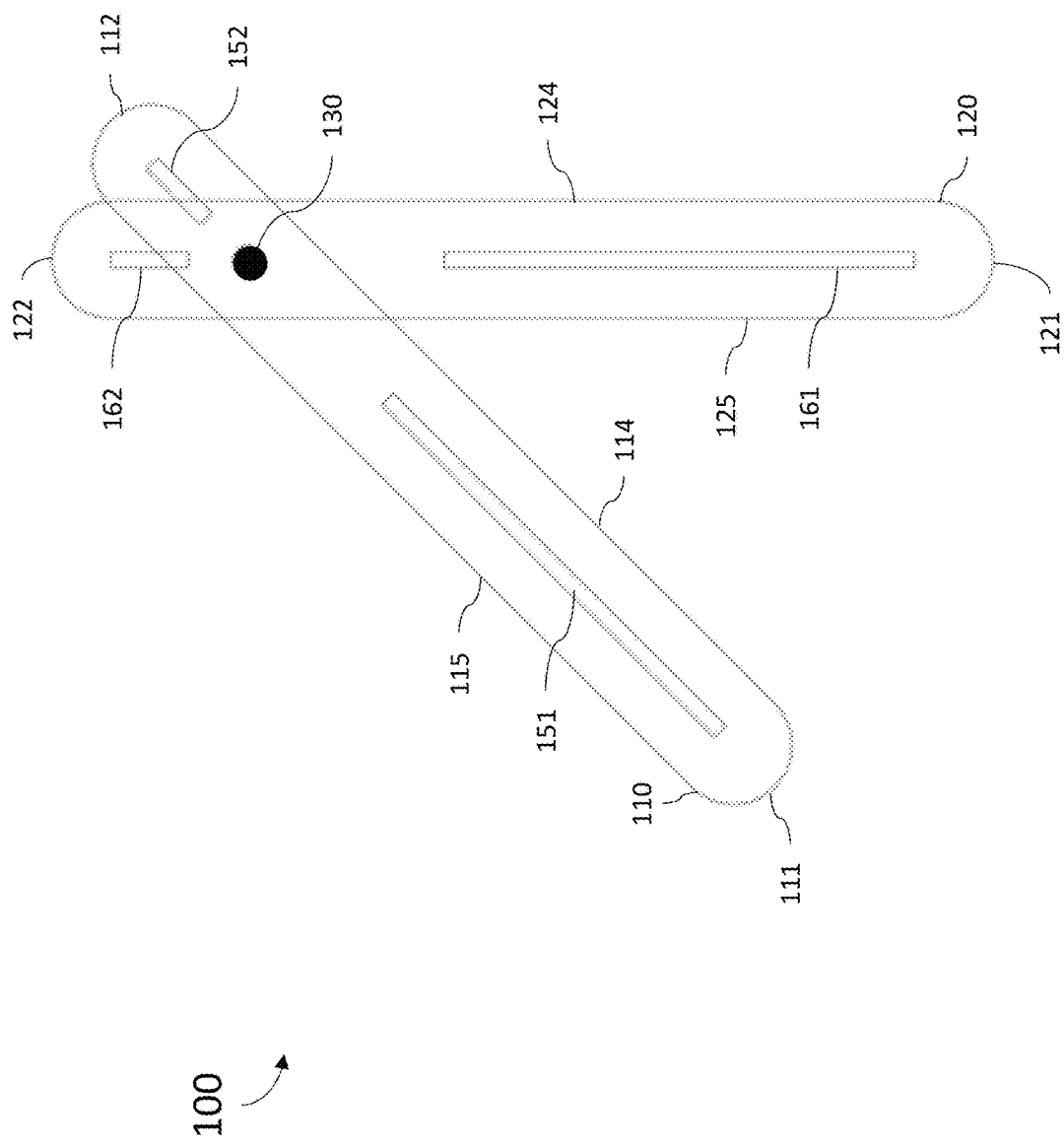

FIGS. 1, 1A and 1B are diagrams illustrating an artist tool 100 for capturing relationships between features in a scene within a field of view of an artist. The tool comprises a first blade 110 that is rotatably coupled to a second blade 120 by a fastener 130. In this embodiment, the first blade 110 and the second blade 120 are both transparent blades fabricated from a transparent material. However, it should be understood that in any of the embodiments discussed herein, either the first blade 110, the second blade 120, or both, may alternatively be fabricated from a non-transparent material.

Examples of devices for implementing the fastener 130 may include, but are not limited to, a rivet, clasp, or other fastening devices. In some embodiments, the blades 110 and 120 each may have flat and/or smooth surfaces. The blades 110 and 120 may be rounded on both ends. In some embodiments, the first transparent blade and the second transparent blade may be similar or identical to each other in structure. As shown in FIG. 1, the first transparent blade and the second transparent blade each have a length extending from a first distal end 111, 121 to a second distal end 112, 122, and a width extending from a first edge 114, 124 to a second edge 115, 125. The blades 110, 120 also each having a fastener hole 116, 126 that is offset from a center point 117, 118 with respect to the length of each blade 110, 120. The fastener 130 penetrates through the fastener hole 116 of the first blade 110 and the fastener hole 126 of the second blade 120 such that the first transparent blade 110 is free to rotate about the second transparent blade 120. In some embodiments, the first transparent blade 110 has a freedom to rotate at least 360 degrees with respect to the second transparent blade 120 around the fastener 130.

Also shown in FIGS. 1, 1A and 1B, the first transparent blade 110 and the second transparent blade 120 may each comprise a first linear slit 151, 161 that extends along a center axis between the first distal end 111, 112 and the fastener hole 116, 126, and a second linear slit 152, 162 that extends along the center access between the second distal end 112, 122 and the fastener hole 116, 126. In some alternate embodiments, just one of the first transparent blade 110 or the second transparent blade 120 may comprise the first linear slit 151, 161 that extends along a center axis between the first distal end 111, 112 and the fastener hole 116, 126. Moreover, the second linear slits 152, 162 on either of the of the first transparent blade 110 or the second transparent blade 120 may be considered optional such that one, both, or neither, of the blades 110, 120 include the feature of the second linear slit 152, 162. The center axis of both blades runs through a center of the respective fastening holes 116, 126. It should be noted that in some embodiments, neither the first slit nor the second slit connect with the fastening hole for either of the blades 110, 120. The first transparent blade 110 and the second transparent blade 120 may each be fabricated from a rigid or semi-rigid transparent material (such as a plastic, polycarbonate, or acrylic, for example) such that the blades 110, 120 are each sufficiently rigid so as to not fold in upon themselves when held upright from one of their distal ends. Moreover, a transparent material would be a material that is sufficiently clear so as to not obfuscate objects being viewed through the blades 110, 120. If objects in a scene can be viewed thought the material of the blades, then the blades are transparent blades. In some embodiments where the blades are transparent blades, the transparent material of the blades has an opacity of 25% or less. In one or more alternate embodiments where either one, or both, of the blades 110, 120 are not transparent, then the material of the non-transparent blades may have an opacity of more than 25%.

In some example embodiments, the blades 110, 120 are between 5 and 6 inches in length from one distal end to the other and may be between ½ and ¾ inches in width. The first linear slits 151, 161 may be about 3 inches in length starting from the first distal ends 111, 112, and the second linear slits 152, 162 about ½ inch in length starting from about ⅜ inch from the second distal ends 112, 122. Moreover, the first linear slits 151, 161 and second linear slits 152, 162 may create an opening in the blades 110, 120 on the order of 1/16 to 3/16 or up to ¼ inch in width. This width should ideally correspond to an opening that allows the artist to make precise markings using their medium (for example, pencil, paint, charcoal, chalk, ink, knife, etc.) through the slits onto the surface they are working with, as further discussed below. In some embodiments, the fastener holes 116, 126 are positioned about 1¼ inches from the second distal ends 112, 122. In some embodiments, the blades 110, 120 may have a thickness in the range of about 1/32 inch to 3/32 inch (or about 0.7 mm to 3 mm). As shown in FIG. 1, the second distal ends 112, 122 sufficiently extend from the fastener holes 116, 126 such that they are exposed and the second linear slits 152, 162 are at least partially uncovered or non-overlapping with the opposing blade. In some embodiments, when the first transparent blade 110 and the second transparent blade 120 are arranged at a 90-degree angle with respect to each other, the second distal end 112 of the first transparent blade 110 is not overlapping with the second transparent blade 120. Moreover, in some embodiments, when the first transparent blade 110 and the second transparent blade 120 are arranged at a 90-degree angle with respect to each other, at least a portion of the second slit 152 of the first transparent blade 110 is not covered by the second transparent blade 120. It should be understood that the specific dimensions discussed above are provided as illustrative examples only.

Figure 1C:
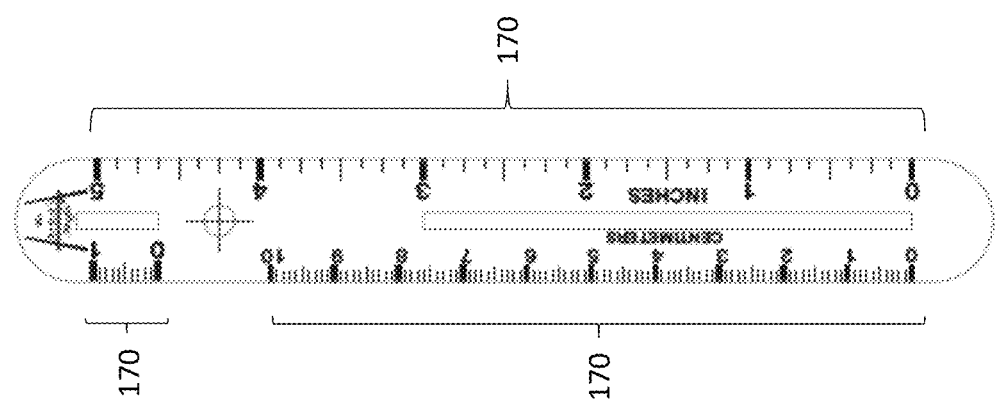

As shown in FIG. 1C, in some embodiments one or both of the blades 110, 120 may include graduated scale markings 170, on their edges such as ruler markings. The graduated scale markings 170 may correspond to a metric scale and/or an imperial scale, but such correspondence is not necessary. In some embodiments, when the blades 110, 120 are fully extended to their maximum length at 180 degrees with respect to each other, the graduated scale markings 170 on one or both edges forms a continuous graduated scale. The graduated scale markings 170 may comprise pigments and/or dies that are printed, silkscreened, or otherwise applied or visibly etched (for example, laser etched) to one or both edges of the blades 110, 120 and/or may comprise raised material or indentions. In some embodiments, a protective coating (e.g., a coating insoluble to paint thinner solvents) over the graduated scale markings so that the blades may be cleaned without striping the graduated scale markings from the blades 110, 120. Common paint thinner solvents may include, but are not limited to, Mineral spirits, White spirit, Acetone, Turpentine, Naphtha, Toluene, Methyl ethyl ketone MEK, Dimethylformamide DMF, 2-Butoxyethanol, or other glycol ethers, Ethylbenzene, Xylene, n-Butyl acetate, Butanol. As such, the protective coating may by insoluble to one or more of these common paint thinner solvents.

Figure 2:
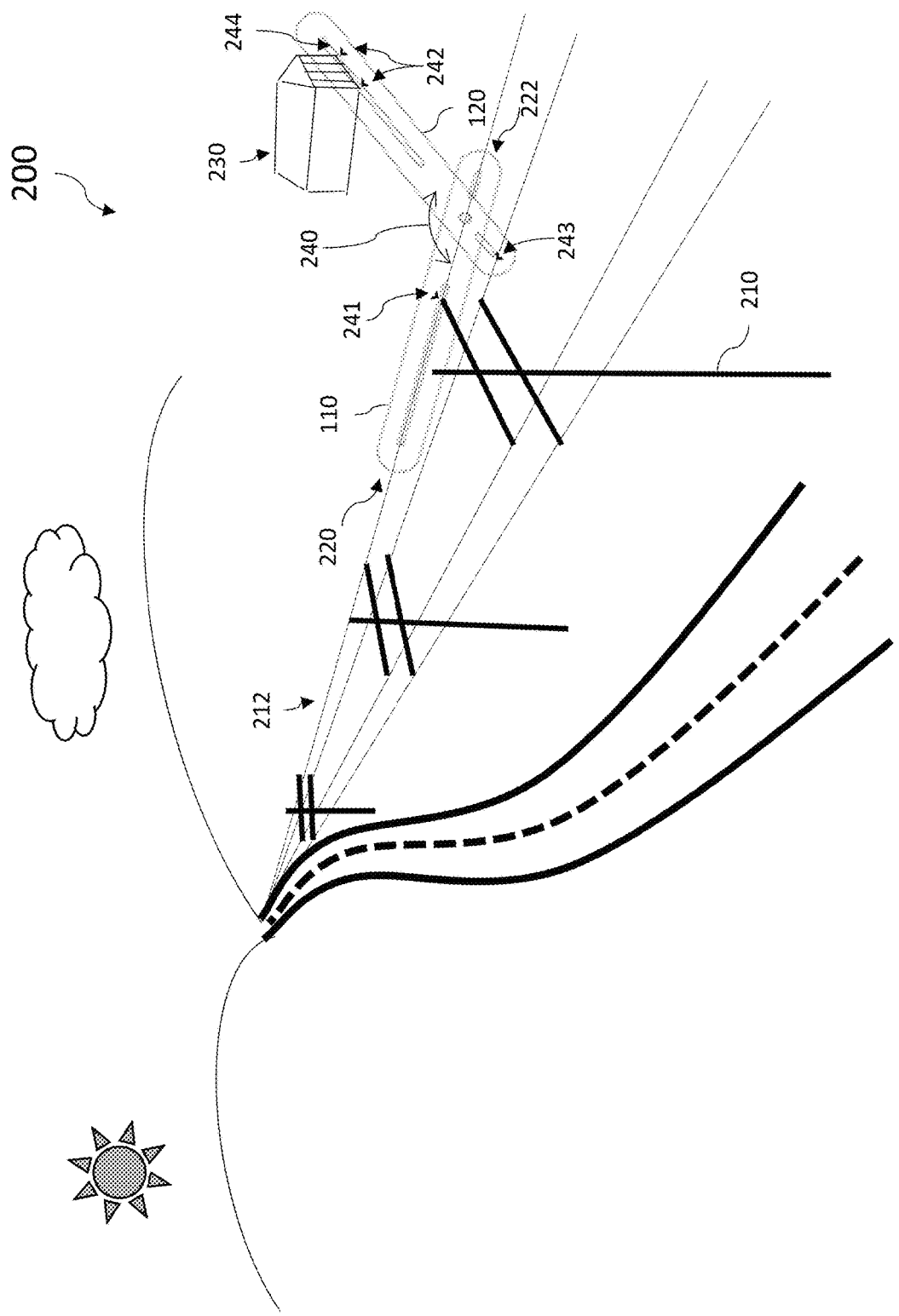
FIGS. 2 and 3 are diagrams and FIG. 4 is a flow chart illustrating an example method embodiment 400 for capturing relationships between features using an example embodiment of the artist tool.
Figure 3:
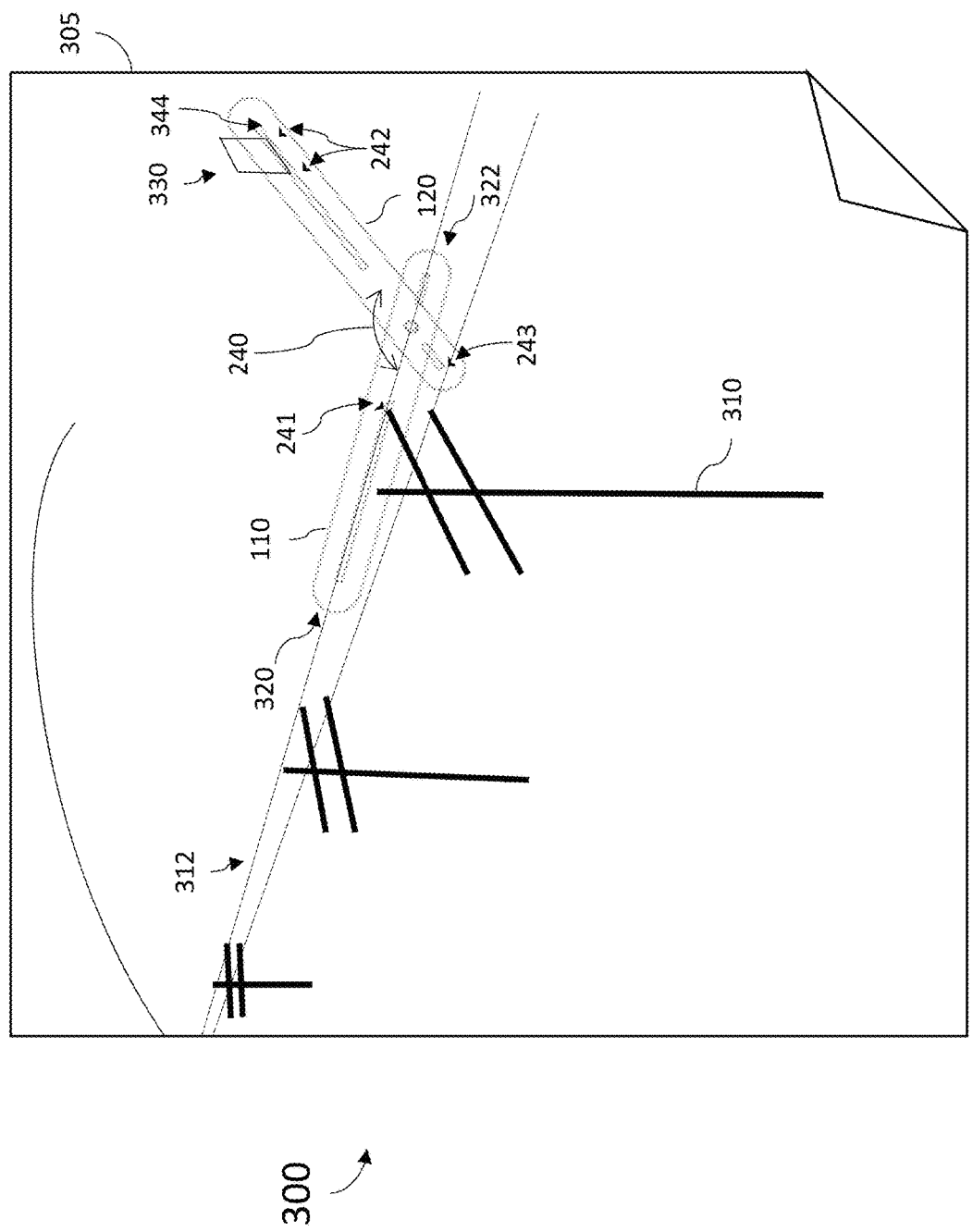
Figure 4:
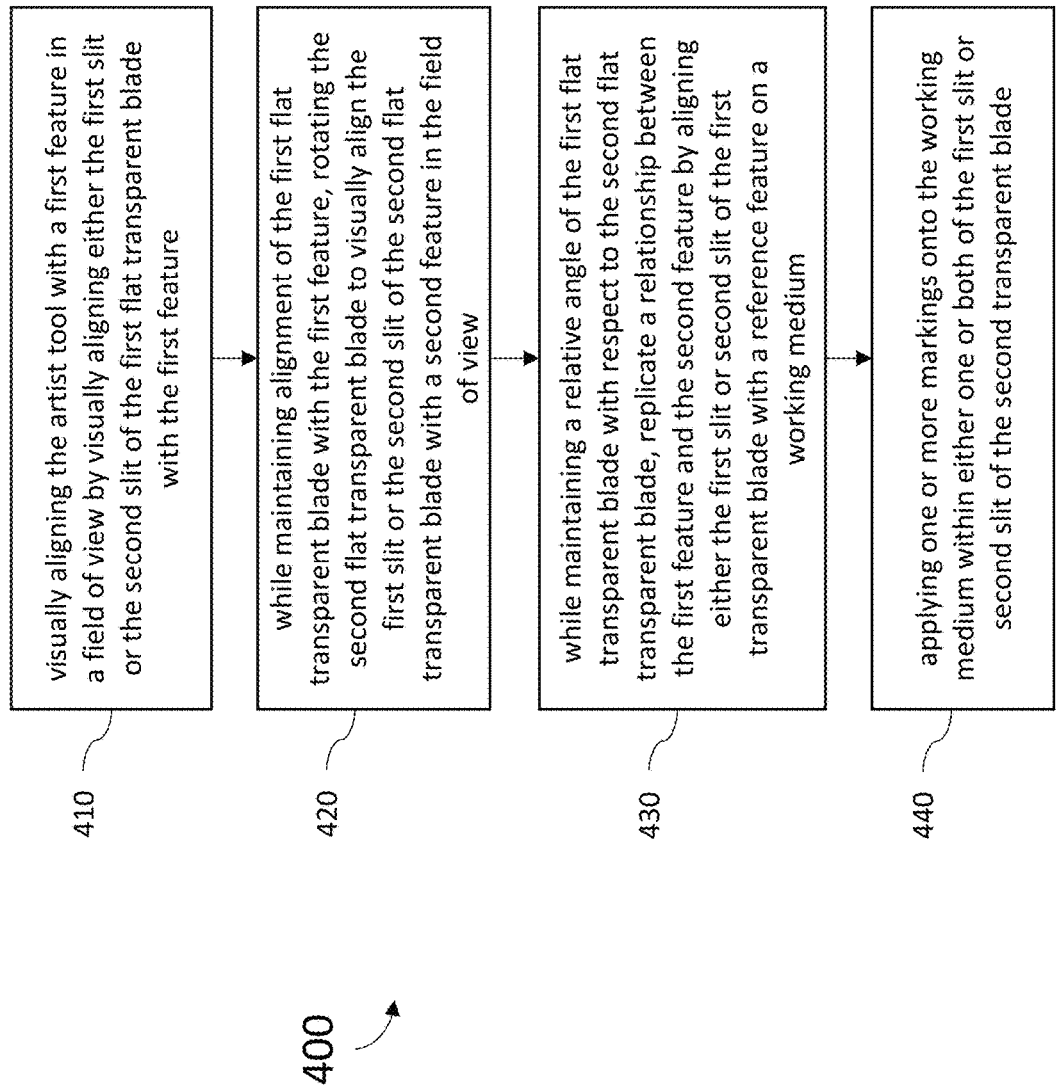

FIGS. 2 and 3 are diagrams and FIG. 4 is a flow chart illustrating an example method embodiment 400 for capturing relationships between features using an example embodiment of the artist tool 100 disclosed with respect to the FIGS. 1 and 1A-1C. The method 400 begins as shown starting at block 410 of FIG. 4 with visually aligning the artist tool 100 with a first feature in a field of view. More specifically, as shown in FIG. 2, an example scene 200 that an artist wishes to capture in their working space comprises a line of poles 210 carrying power lines 212 that extend to the horizon. As shown in FIG. 3, at 300, the artist has captured a portion of that scene 200 on their working space 305 as a line of poles 310 carrying power lines 312 that extend to the horizon. The term "working space" as used herein is intended to encompass both 2-dimensional spaces and 3-dimensional spaces. The example working space 305 shown in FIG. 3 may thus comprise a sheet of paper or canvas, but it is understood that a working space for practicing methods of the present disclosure may comprise any surface such as but not limited so flat, curved or textured surfaces of canvas, paper, wood, stone or metal plates, or three-dimensional space or material such as a sculpting material (clay, for example), glass, bronze or other molding or casting material for creating a 3D object of any product/material. At block 410, the artists proceed with visually aligning either the first slit or the second slit of the first transparent blade 110 with a first feature. In this example scene 200, the artist has aligned the first slit and second slits of the first transparent blade 110 with one of the power lines 212 as shown at 220 and 222 (the first feature) for the purpose of capturing a relationship in terms of scale and perspective of that power line 212 with a building 230 of interest that they wish to accurately represent on the working space 305. As such, the process 400 proceeds to 420 where the artists, while maintaining alignment of the first transparent blade 110 with the first feature (power line 212), rotates the second transparent blade 120 to visually align the first slit or the second slit of the second transparent blade 120 with a second feature in the field of view. In this example the second feature comprises a wall's ground edge portion of the building 230 structure where the building 230 meets the ground as shown at 244. At this point, the relative angle formed between the first transparent blade 110 and the second transparent blade 120 captures a spatial and angular relationship between the first and second features in the scene 200 that may now be transferred to the working space 305. It should be noted that because the first and second blades 110 and 120 of the tool 100 are transparent, the artists may capture this relationship while still assessing other features and components of the scene 200. In some embodiments, the alignments at 410 and 420 may be performed with the artists holding the artist tool out in front of them (for example, at arm's length) as they view the first and second features through the slits of the blades. It should be noted that the relationship between and two features may be captured in this matter, whether the features are elements of different objects, or features of the same objects. For example, the relationship between a roofline and corner of the building 230 may be captured in the same manner as just described. In some embodiments, which the artist tool 100 is still aligned per blocks 410 and 420, the method may further comprise applying one or more markings to either the first transparent blade 110 or the second transparent blade 120 to capture additional relationships and scale information. For example, a marking may be applied to note the position of another feature appearing in a slit such as shown at 241 where a marking is made to indicate a position where an arm of the pole intersects with the power line 212 being used as the first feature, or such as shown at 243 where a marking is made to indicate a position where a second power line 212 passes through the second slit of the second arm from the perspective of the artists using the tool 100. Moreover, with respect to the building of interest 230, markings may be applied to the second blade as shown at 242 to denote where the wall's ground edge portion of the building 230 structure begins and ends as viewed through the first slit of the second blade 120. In some embodiments, graduated scale markings 170 may be used instead of, or together with the markings 241, 242 and 242 to establish the relative position of the features.

The method then proceeds to 430 where, while maintaining a relative angle of the first transparent blade with respect to the second transparent blade, the method comprises replicating the relationship between the first feature and the second feature by aligning either the first slit or second slit of the first transparent blade with a reference feature on a working space 305. Note that the reference feature need not be a prior marking if the tool 100 is being used to mark the first rendering on the working space 305. Moreover, it should be understood that the rendering being created on the working space 305 may be an expressionist art form or an abstract one, in which case the tool 100 allows the artists to incorporate the relationship of two objects desired in the art piece. Referring to FIG. 3, the artist may align the first and second slits of the first blade 110 with a representation of the power line 312 appearing on the working space 305 to use that feature as an alignment reference. Moreover, optionally the marking 241 may be aligned with the arm of the pole 310 already appearing on the working space 305 and the marking 243 may be aligned with second power line already appearing on the working space 304. The second blade 120, and more specifically the first and second slits of the second blade 120, may then be used to replicate the perspective and angular relationship between the power line 212 and the wall's ground edge portion of the building 230 on the working space 305 as shown at 344. As such the method proceed to 440 with applying one or more markings onto the working space within either one or both of the first slit or the second slit of the second transparent blade 120. The markings applied onto the working space 304 may then be utilized by the artist as a baseline for accurately rendering the building 230 onto the working space 305, or adding one or more other features to the working space 305 (whether actually observed objects or artistically inspired) that the artists wished to be correctly aligned. For example, as shown in FIG. 3 generally at 330, a line on the working space 305 may be marked in the first slit of blade 120 between the two markings at 242 to define where the wall's ground edge portion of building 230 should appear in order to begin rendering the building 230 on the working space 305.

Example Embodiments

Example 1 includes an artist tool for capturing relationships between features, the tool comprising: a first transparent blade; a second transparent blade, the first transparent blade and the second transparent blade each having a length extending from a first distal end to a second distal end, and a width extending from a first edge to a second edge, each having a fastener hole offset from a center point, with respect to the length of each blade; and a fastener that penetrates through the fastener hole of the first blade and the fastener hole of the second blade such that the first transparent blade is rotatably coupled to the second transparent blade by the fastener; the first transparent blade and the second transparent blade each comprising a first linear slit that extends along a center axis between the first distal end and the fastener hole, and a second linear slit that extends along the center axis between the second distal end and the fastener hole, wherein the center axis passes through a center of the fastening hole.

Example 2 includes the tool of example 1, wherein neither the first slit nor the second slit connect with the fastening hole.

Example 3 includes the tool of any of examples 1-2, wherein either or both of the first the first transparent blade or the second transparent blade comprise graduated scale markings on one or both of the first edge or the second edge.

Example 4 includes the tool of example 3, wherein the graduated scale markings comprise etched, pigmented or dyed markings.

Example 5 includes the tool of any of examples 3-4, wherein the graduated scale markings comprise either raised or indented markings.

Example 6 includes the tool of any of examples 3-5, wherein the graduated scale markings include one or both of a metric scale or an imperial scale.

Example 7 includes the tool of any of examples 1-6, wherein the first transparent blade and the second transparent blade comprise a transparent material.

Example 8 includes the tool of any of examples 1-7, wherein the first transparent blade and the second transparent blade are free to rotate 360 degrees with respect to each other around the fastener.

Example 8 includes the tool of any of examples 1-8, wherein one or both of the first distal end or the second distal end are curved.

Example 10 includes the tool of any of examples 1-9, wherein the first linear slit and the second linear slit are between $\frac{1}{16}$ to $\frac{3}{16}$ inches in width.

Example 11 includes the tool of any of examples 1-10, wherein the first transparent blade and the second transparent blade are each less than six inches in length.

Example 12 includes the tool of any of examples 1-11, wherein when the first transparent blade and the second transparent blade are arranged at a 90-degree angle with respect to each other, the second distal end of the first transparent blade is not overlapping with the second transparent blade.

Example 13 includes the tool of any of examples 1-12, wherein when the first transparent blade and the second transparent blade are arranged at a 90-degree angle with respect to each other, at least a portion of the second slit of the first transparent blade is not covered by the second transparent blade.

Example 14 includes a method for capturing relationships between features, the method comprising: visually aligning an artist tool with a first feature in a field of view, the artist tool comprising: a first transparent blade; a second transparent blade, the first transparent blade and the second transparent blade each having a length extending from a first distal end to a second distal end, and a width extending from a first edge to a second edge, each having a fastener hole offset from a center point, with respect to the length of each blade; and a fastener that penetrates through the fastener hole of the first blade and the fastener hole of the second blade such that the first transparent blade is rotatably coupled to the second transparent blade by the fastener; the first transparent blade and the second transparent blade each comprising a first linear slit that extends along a center axis between the first distal end and the fastener hole, and a second linear slit that extends along the center axis between the second distal end and the fastener hole, wherein the center axis passes through a center of the fastening hole; wherein visually aligning the artist tool comprises visually aligning either the first slit or the second slit of the first transparent blade with the first feature; while maintaining alignment of the first transparent blade with the first feature, rotating the second transparent blade to visually align the first slit or the second slit of the second transparent blade with a second feature in the field of view; while maintaining a relative angle of the first transparent blade with respect to the second transparent blade, replicate a relationship between the first feature and the second feature by aligning either the first slit or second slit of the first transparent blade with a reference feature on a working space; and applying one or more markings onto the working space within either one or both of the first slit or second slit of the second transparent blade.

Example 15 includes the method of example 14, wherein the first feature in the field of view is located on a different object that the second feature in the field of view.

Example 16 includes the method of any of examples 14-15, further comprising: holding the artist tool arm's length while visually aligning the artist tool with a first feature in a field of view.

Example 17 includes the method of any of examples 14-16, wherein the working space comprises at least one of: canvas; paper; wood; a sculpture; a stone or metal plate; a casting material; or a sculpting material.

Example 18 includes the method of any of examples 14-17, further comprising: applying one or more markings to either the first transparent blade or the second transparent blade.

Example 19 includes the method of any of examples 14-18, wherein either or both of the first the first transparent blade or the second transparent blade comprise graduated scale markings on one or both of the first edge or the second edge.

Example 20 includes the method of example 19, further comprising: measuring a characteristic of either the first feature or the second future using the graduated scale markings; and wherein applying the one or more markings onto the working space within either one or both of the first slit or second slit of the second transparent blade is at least in part based on the measured characteristic.

It should be understood that while this disclosure illustrates applications for using the tool 100 by an "artist", referring to the user of the tool 100 as an "artist" is only to facilitate the ease of describing the embodiments discussed herein. It should be understood that the user may instead be an architect, engineer, surveyor, draftsperson, or any other user, regardless of whether they are, or consider themselves, engaged in an artistic endeavor. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. An artist tool for capturing relationships between features, the tool comprising:
   a first transparent blade;
   a second transparent blade, the first transparent blade and the second transparent blade each having a length extending from a first distal end to a second distal end, and a width extending from a first edge to a second edge, each having a fastener hole offset from a center point, with respect to the length of each blade; and
   a fastener that penetrates through the fastener hole of the first blade and the fastener hole of the second blade such that the first transparent blade is rotatably coupled to the second transparent blade by the fastener;
   the first transparent blade and the second transparent blade each comprising a first linear slit that extends along a center axis between the first distal end and the fastener hole, and a second linear slit that extends along the center axis between the second distal end and the fastener hole, wherein the center axis passes through a center of the fastening hole.

2. The tool of claim 1, wherein neither the first slit nor the second slit connect with the fastening hole.

3. The tool of claim 1, wherein either or both of the first the first transparent blade or the second transparent blade comprise graduated scale markings on one or both of the first edge or the second edge.

4. The tool of claim 3, wherein the graduated scale markings comprise etched, pigmented or dyed markings.

5. The tool of claim 3, wherein the graduated scale markings comprise either raised or indented markings.

6. The tool of claim 3 wherein the graduated scale markings include one or both of a metric scale or an imperial scale.

7. The tool of claim 1, wherein the first transparent blade and the second transparent blade comprise a transparent material.

8. The tool of claim 1, wherein the first transparent blade and the second transparent blade are free to rotate 360 degrees with respect to each other around the fastener.

9. The tool of claim 1, wherein one or both of the first distal end or the second distal end are curved.

10. The tool of claim 1, wherein the first linear slit and the second linear slit are between 1/16 to 3/16 inches in width.

11. The tool of claim 1, wherein the first transparent blade and the second transparent blade are each less that six inches in length.

12. The tool of claim 1, wherein when the first transparent blade and the second transparent blade are arranged at a 90-degree angle with respect to each other, the second distal end of the first transparent blade is not overlapping with the second transparent blade.

13. The tool of claim 1, wherein when the first transparent blade and the second transparent blade are arranged at a 90-degree angle with respect to each other, at least a portion of the second slit of the first transparent blade is not covered by the second transparent blade.

14. A method for capturing relationships between features, the method comprising:
   visually aligning an artist tool with a first feature in a field of view, the artist tool comprising:
   a first transparent blade;
   a second transparent blade, the first transparent blade and the second transparent blade each having a length extending from a first distal end to a second distal end, and a width extending from a first edge to a second edge, each having a fastener hole offset from a center point, with respect to the length of each blade; and a fastener that penetrates through the fastener hole of the first blade and the fastener hole of the second blade such that the first transparent blade is rotatably coupled to the second transparent blade by the fastener;

the first transparent blade and the second transparent blade each comprising a first linear slit that extends along a center axis between the first distal end and the fastener hole, and a second linear slit that extends along the center axis between the second distal end and the fastener hole, wherein the center axis passes through a center of the fastening hole;

wherein visually aligning the artist tool comprises visually aligning either the first slit or the second slit of the first transparent blade with the first feature;

while maintaining alignment of the first transparent blade with the first feature, rotating the second transparent blade to visually align the first slit or the second slit of the second transparent blade with a second feature in the field of view;

while maintaining a relative angle of the first transparent blade with respect to the second transparent blade, replicate a relationship between the first feature and the second feature by aligning either the first slit or second slit of the first transparent blade with a reference feature on a working space; and applying one or more markings onto the working space within either one or both of the first slit or second slit of the second transparent blade.

15. The method of claim 14, wherein the first feature in the field of view is located on a different object that the second feature in the field of view.

16. The method of claim 14, further comprising:
holding the artist tool arm's length while visually aligning the artist tool with a first feature in a field of view.

17. The method of claim 14, wherein the working space comprises at least one of:
canvas;
paper;
wood;
a sculpture;
a stone or metal plate;
a casting material; or
a sculpting material.

18. The method of claim 14, further comprising:
applying one or more markings to either the first transparent blade or the second transparent blade.

19. The method of claim 14, wherein either or both of the first the first transparent blade or the second transparent blade comprise graduated scale markings on one or both of the first edge or the second edge.

20. The method of claim 19, further comprising: measuring a characteristic of either the first feature or the second future using the graduated scale markings; and
wherein applying the one or more markings onto the working space within either one or both of the first slit or second slit of the second transparent blade is at least in part based on the measured characteristic.

* * * * *